United States Patent [19]
Murphy

[11] Patent Number: 5,529,402
[45] Date of Patent: Jun. 25, 1996

[54] TAPERED DRAWN CUP NEEDLE BEARING

[75] Inventor: Richard F. Murphy, Torrington, Conn.

[73] Assignee: The Torrington Company, Torrington, Conn.

[21] Appl. No.: 329,602

[22] Filed: Oct. 26, 1994

[51] Int. Cl.[6] ..................................................... F16C 33/58
[52] U.S. Cl. ............................................. 384/564; 384/571
[58] Field of Search ..................................... 384/571, 569, 384/570, 905.1, 584, 564

[56] References Cited

U.S. PATENT DOCUMENTS

| | | |
|---|---|---|
| 1,520,053 | 12/1924 | Drotschmann . |
| 2,259,325 | 10/1941 | Robinson . |
| 3,307,891 | 3/1967 | Carullo . |
| 4,948,271 | 8/1990 | Nunotani et al. ....................... 384/571 |
| 4,978,235 | 12/1990 | Jacob ..................................... 384/450 |

Primary Examiner—Lenard A. Footland
Attorney, Agent, or Firm—John C. Bigler

[57] ABSTRACT

A drawn cup bearing has a tapered inside surface which was shaped by a tapered punch.

2 Claims, 5 Drawing Sheets

TAPERED DRAWN CUP NEEDLE BEARING

BACKGROUND OF THE INVENTION

This invention relates generally to bearings. More particularly, this invention is a new bearing and a new method of making the bearing which is particularly adapted for a use on a shaft which deflects due to side loading.

For certain uses, drawn cup bearings are press-fitted into housings in order to position the bearings as well as insure roundness and proper bore size of the assembled bearing. Currently, drawn cup bearings are used to support the shaft pinion gears used in the gear cases of engines such as the two cycle engines. The pinion gear shaft is subject to side loading and thus results in severe bending of the shaft. When a standard roller bearing is used, the shaft contacts only one end of each roller rather than spread its load along the length of the roller. This, of course, places undesired limitations on the bearing life.

In an attempt to provide contact along the length of the roller in the past, the outside diameter of the bearing cup has been ground to a tapered surface. This tapered surface allows the bearing cup to tilt to a cocked orientation relative to the bearing housing, allowing the rollers to conform to the deflected shaft. Since an additional outside diameter grinding of the bearing cup is required with the conventional method of making the bearing cup, the cost of the cup is increased.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

Briefly described, the bearing includes an annular race. A plurality of cylindrical rollers with reduced ends are contained in the race. At least the race-roller contact length of the race is tapered.

Briefly described, the new method of making the bearing comprises the steps of placing a drawn cup having an annular wall of substantially the same thickness throughout its length at the entrance of a sizing die having a bore of the same diameter throughout its length. Thereafter a tapered punch is inserted into the drawn cup and sizing die bore to provide a wall having an outside surface the same diameter throughout its length and a tapered inside surface. Finally, the resulting drawn cup is shaped into an annular race having a constant outside diameter and a tapered bore.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
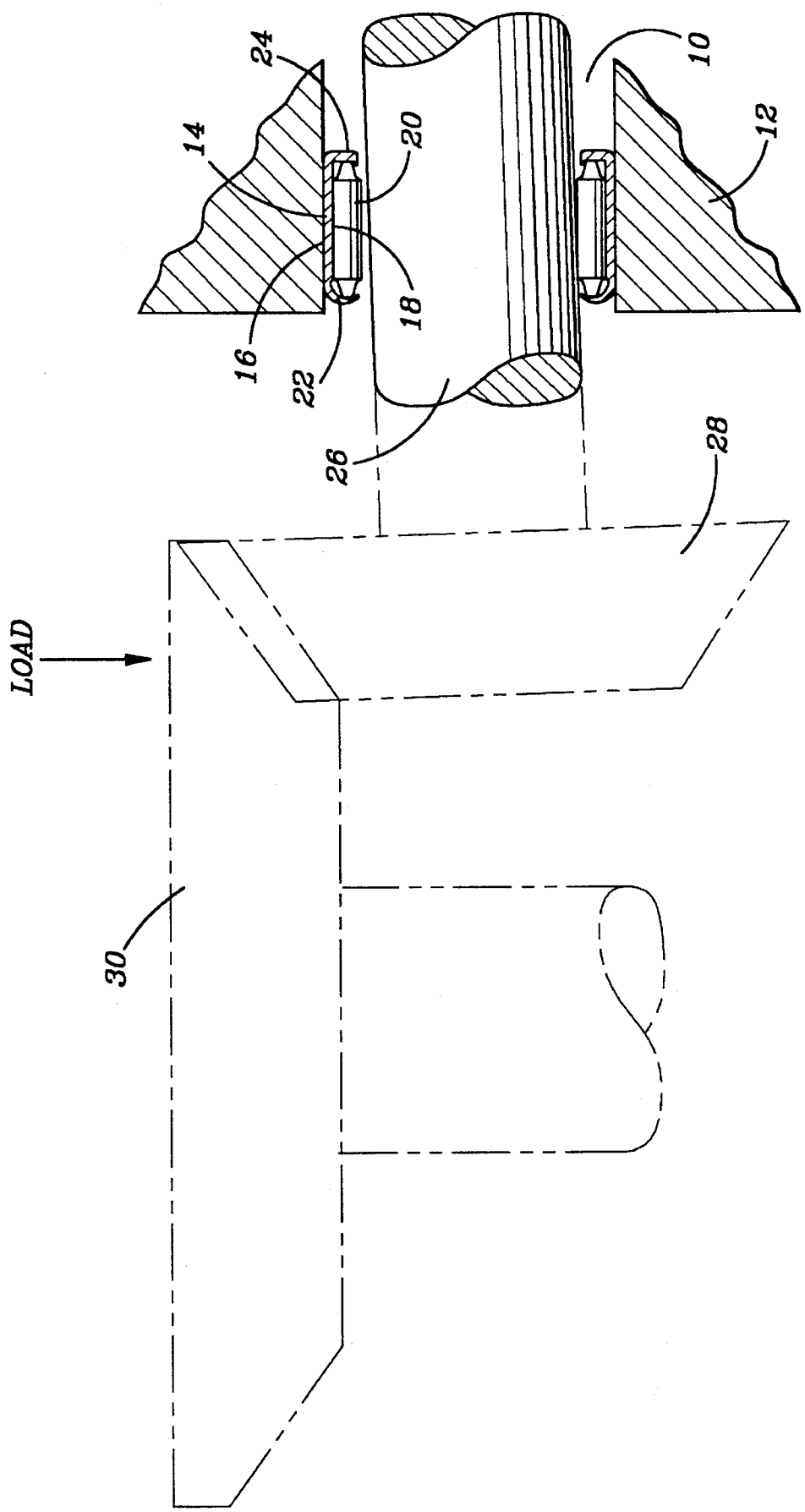
FIG. 1 is a view showing a conventional bearing used in the pinion position in the gear case for a two cycle engine, the bearing being shown in cross section.

Referring to the drawings and particularly to FIG. 1, a drawn cup type conventional bearing is shown inserted into the bore 10 of a metal housing. The bearing includes an annular race 14 having an outside surface 16 and an inside surface 18. A plurality of trunnion rollers 20 are contained within the annular race 14. The trunnion rollers are cylindrical with reduced ends and kept in place by the curled end 22 at one end of the race and by means to contain the trunnion rollers, such as the annular radially extending portion 24 at the other end of the annular race.

A rotating shaft 26 extending from a bevel gear 28 extends through the bore of the annular race 14. Bevel gear 28 meshes with a larger bevel gear 30. These bevel gears might, for example, be a pinion gear such as might be used with a gear case for two cycle engine applications.

Figure 2:
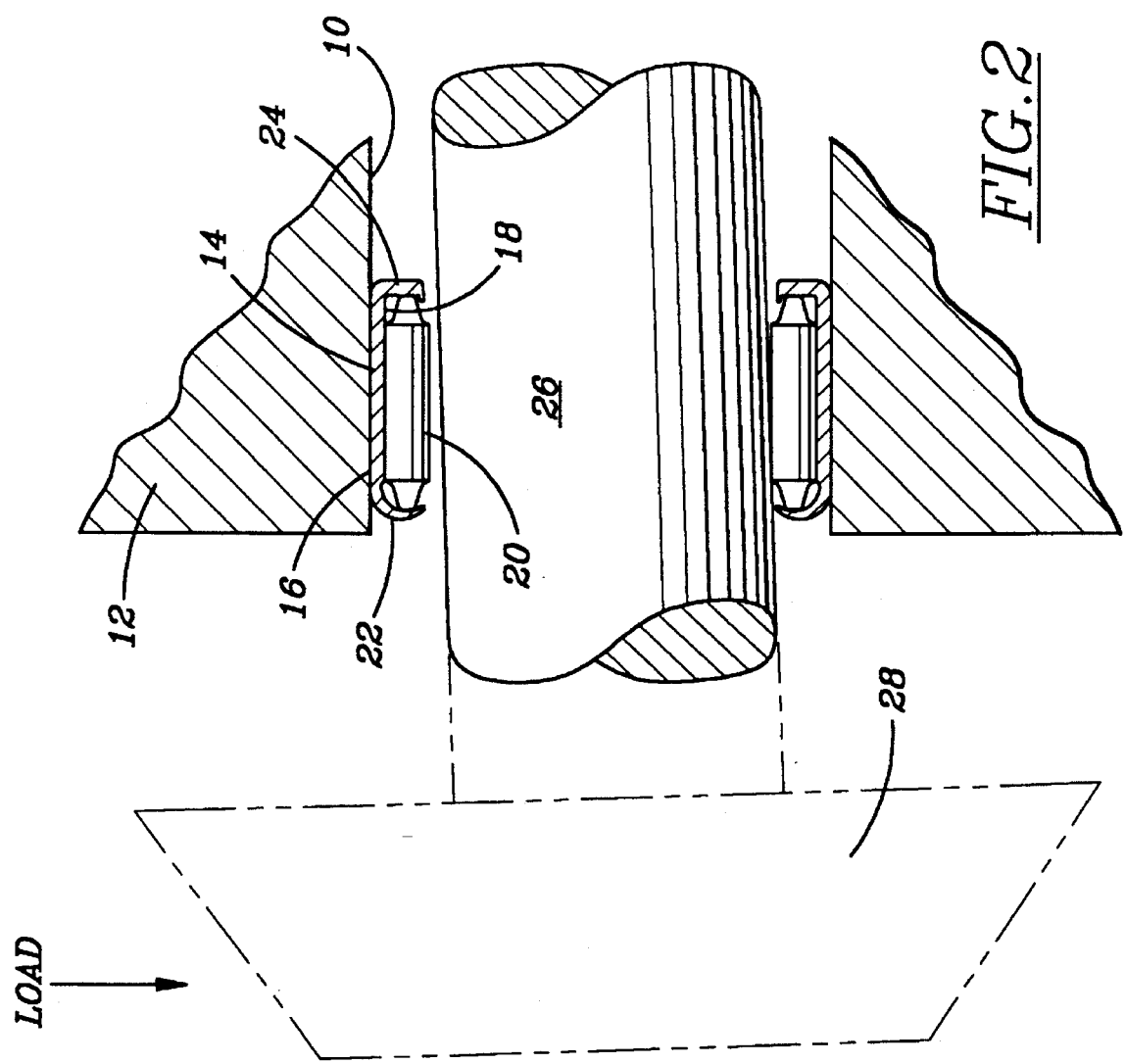
FIG. 2 is an enlarged partial view of FIG. 1.

The pinion shaft 26 is a fairly long shaft and will deflect upon the application of a side loading. Such a deflection is shown more clearly in FIG. 2 where the side load direction is indicated by the arrow. A standard roller bearing is shown in FIG. 1 and FIG. 2. That is, the inside and outside surfaces of the annular member 14 are parallel. If such a standard roller bearing were used, the shaft 26 would contact only one end of each trunnion roller 20 rather than spread its load along the length of the roller.

Figure 3:
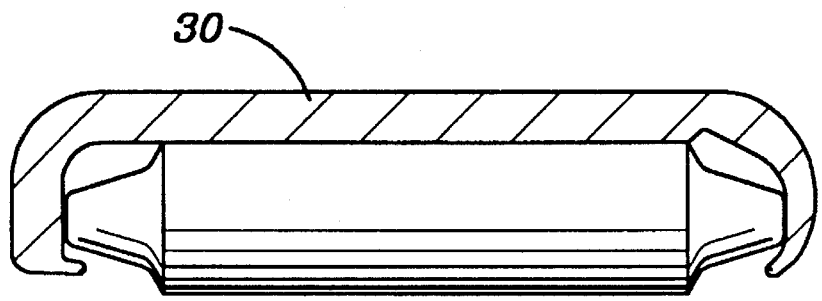
FIGS. 3, 4 and 5 are sectional views useful in explaining a current method for making tapered walled bearings.
Figure 4:
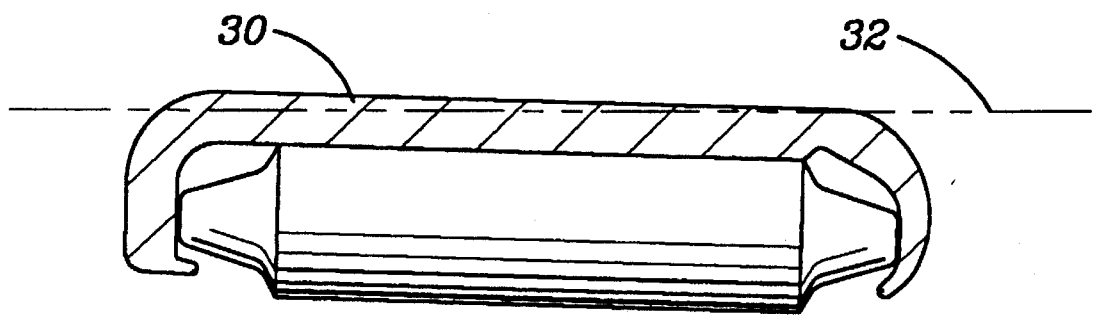
Figure 5:
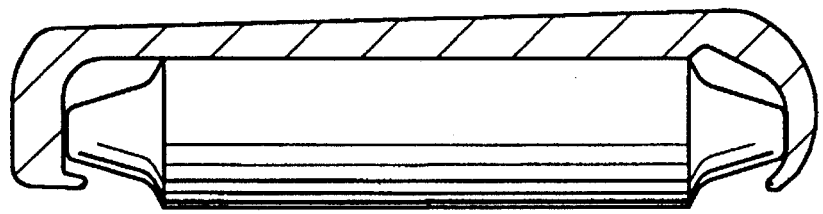

A current method for providing contact along the entire length of the roller is illustrated in FIG. 3, FIG. 4, and FIG. 5. FIG. 3 shows in partial cross section a standard bearing with an annular race having a straight outside surface 30. The outside surface is ground to a tapered surface. The grinding of the outside surface is indicated by the broken lines 32 of FIG. 4. The resulting bearing is shown in FIG. 5. Grinding the outside diameter of the annular race to provide a tapered outside surface allows the bearing to tilt to a cocked orientation relative to the bearing housing when the bearing is press fit into the housing. This allows the roller to conform to the deflected shaft.

Figure 6:
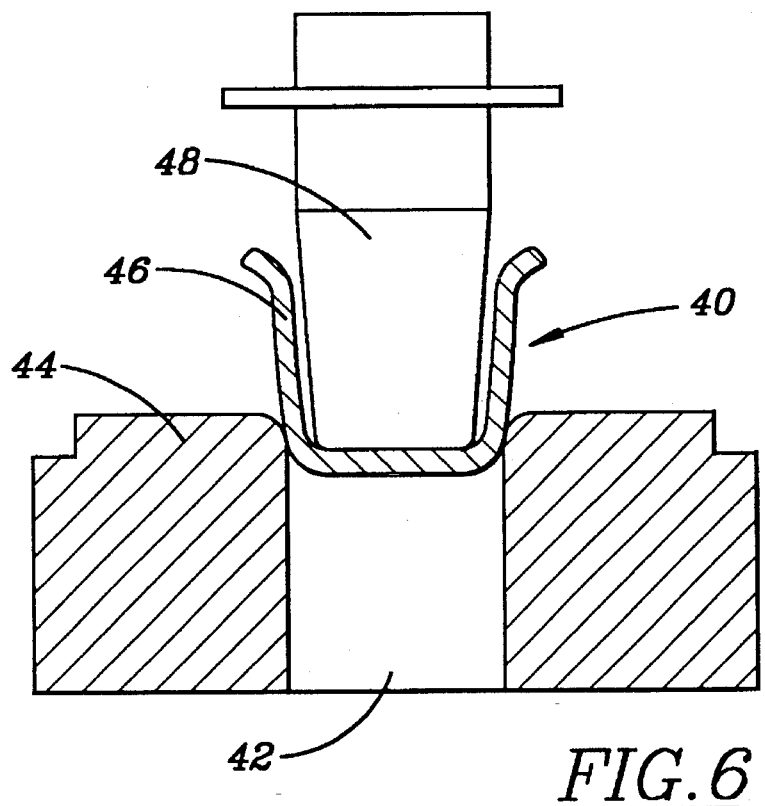
FIGS. 6 and 7 are sequential views useful in explaining the method of forming the new race of this invention.
Figure 7:
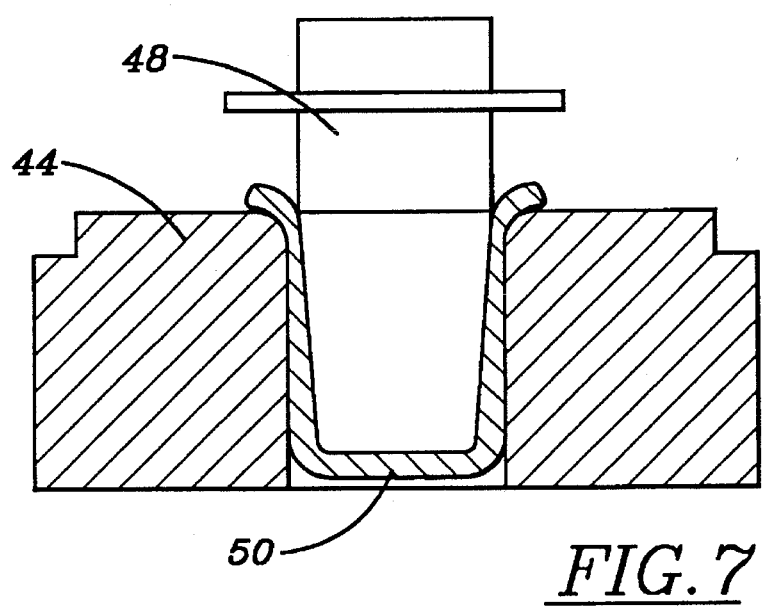

With the conventional way of making a tapered surface illustrated in FIGS. 3 through 5, the grinding operation requires an expensive machining operation to achieve the tapered outside surface. The annular race of my invention is made by a process of draw tooling, thereby eliminating the need for an expensive machining operation. Referring to FIG. 6, the drawn cup 40 is placed on the top of a bore 42 extending through a sizing die 44. The cup 40 has an annular wall 46 of substantially the same thickness throughout its length. A tapered punch 48 is inserted into the drawn cup 40 and pushed into the bore 42 to provide a wall having an outside surface the same diameter throughout its length and a tapered inside surface. Though not shown, the cup is then removed from the sizing die, the bottom 50 of the cup is punched out, and the ends of the side wall are curled radially inwardly to form means to contain the trunnion rollers.

Figure 8:
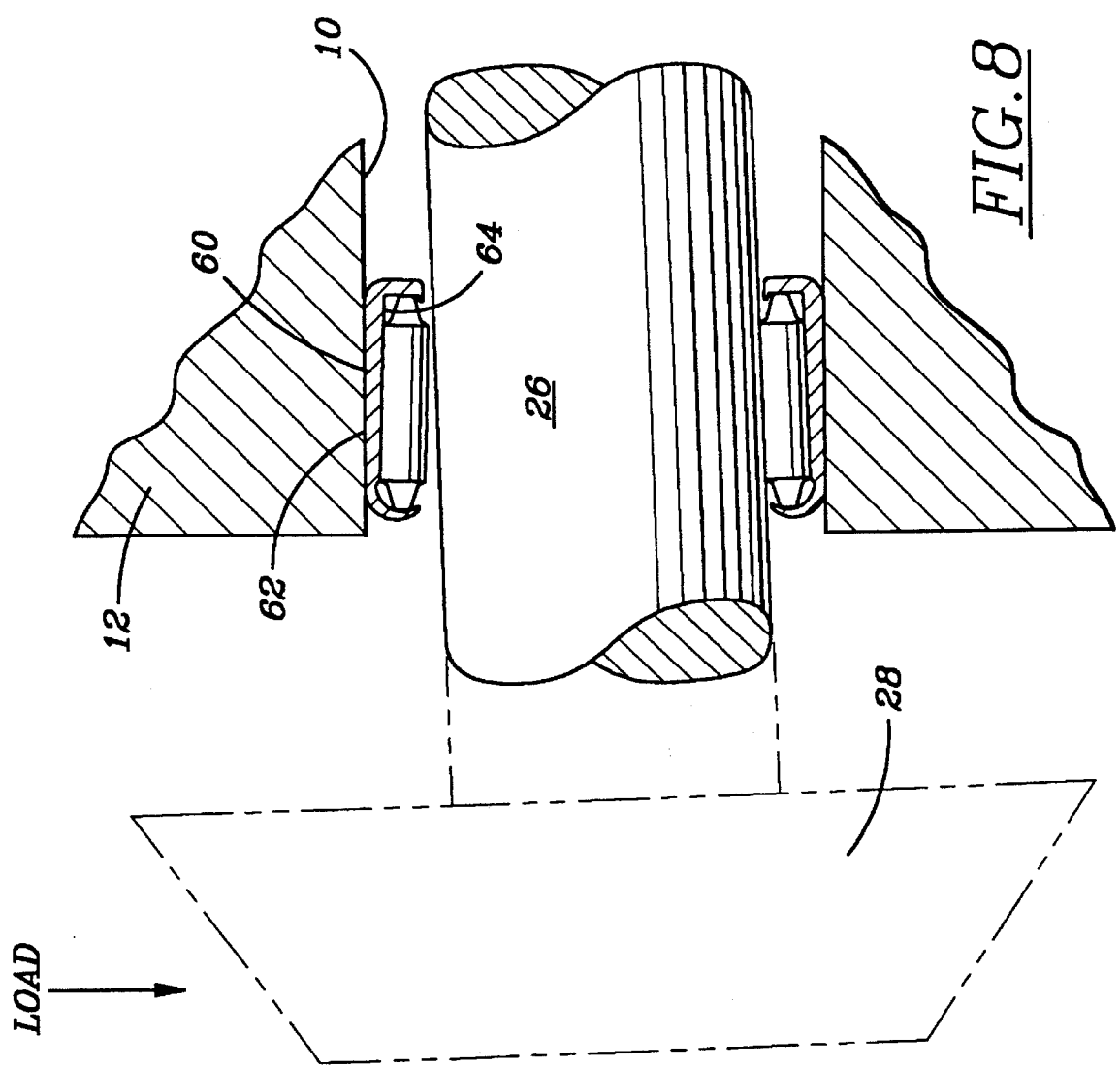
FIG. 8 is a view partly in section showing a tapered walled bearing about the pinion shaft and within the housing.

FIG. 8 shows my new bearing press fit into the bore 10 of the housing 12. The bearing includes an annular race 60 having an outside surface 62 and an inside surface 64. The plurality of trunnion rollers 20 are contained in the race. At least the race-roller contact length of the inside surface of the annular race should be tapered. In the embodiment shown in FIG. 8 the entire length of the inside surface of the race is tapered.

The outside surface of the annular race is straight and parallel to the center line of the bearing housing. The inside surface of the annular race is tapered such that the radially inward surfaces of the rollers provide surfaces for receiving the deflected shaft such that the shaft contacts the rollers along their length.

Having described the invention, what is claimed is:

1. A drawn cup type bearing for use in a bore of a metal housing comprising:

an annular race having a constant diameter outside surface and an inside surface;

a plurality of cylindrical rollers kept in place by means provided at the ends of said race; and at least the race-roller contact length of the inside surface of the annular race being formed by keeping the outside surface diameter constant while shaping the inside surface having a tapered bore.

2. A bearing in accordance with claim 1 wherein: the entire length of the inside surface of the race is tapered.

* * * * *